United States Patent
Bhagwan et al.

(10) Patent No.: US 10,169,463 B2
(45) Date of Patent: *Jan. 1, 2019

(54) DATA INGEST OPTIMIZATION

(71) Applicant: INTERNATIONAL BUSINESS MACHINES CORPORATION, Armonk, NY (US)

(72) Inventors: Varun Bhagwan, San Jose, CA (US); Tyrone W. A. Grandison, San Jose, CA (US); Daniel F. Gruhl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,230

(22) Filed: Feb. 2, 2017

(65) Prior Publication Data

US 2017/0147693 A1  May 25, 2017

Related U.S. Application Data

(63) Continuation of application No. 13/604,096, filed on Sep. 5, 2012, now Pat. No. 9,589,065, which is a
(Continued)

(51) Int. Cl.
*G06F 17/30* (2006.01)

(52) U.S. Cl.
CPC .. *G06F 17/30864* (2013.01); *G06F 17/30899* (2013.01)

(58) Field of Classification Search
CPC ........... G06F 17/2785; G06F 17/30017; G06F 17/2818; G06F 17/30289; G06F 3/0481;
(Continued)

(56) References Cited

U.S. PATENT DOCUMENTS 5,555,441 A * 9/1996 Haddad .............. H04N 7/17336
348/E7.071
6,253,188 B1  6/2001 Witek et al.
(Continued)

OTHER PUBLICATIONS

Non Final Office Action issued in U.S. Appl. No. 13/015,971 dated May 16, 2013.
(Continued)

*Primary Examiner* — Yuk Ting Choi
(74) *Attorney, Agent, or Firm* — Tutunjian & Bitetto, P.C.; Kristofer Haggerty

(57) ABSTRACT

Methods and systems for optimizing the retrieval of data from multiple sources are described. A slot map including slots for the storage of data elements can be obtained. The data elements associated with the slots can be prioritized by weighting values with costs of retrieving the data elements from respective data sources. Each value can be associated with a different data element and can indicate a respective degree of importance of the associated data element. Further, the systems and methods can direct the retrieval of data elements from the respective data sources in an order in accordance with the priority of the data elements to optimize the quality of data obtainable within a critical time constraint. In addition, the retrieved data elements can be stored in corresponding slots on a storage medium.

20 Claims, 3 Drawing Sheets

Related U.S. Application Data continuation of application No. 13/015,971, filed on Jan. 28, 2011, now abandoned.

(58) Field of Classification Search
CPC ... G06Q 10/06; G06Q 10/0639; G06N 99/005
See application file for complete search history.

(56) References Cited

U.S. PATENT DOCUMENTS

| | | | |
|---|---|---|---|
| 6,675,209 B1* | 1/2004 | Britt | H04L 47/10 709/224 |
| 7,343,266 B2 | 3/2008 | Liu et al. | |
| 8,260,833 B2 | 9/2012 | Dazzi et al. | |
| 2004/0095885 A1* | 5/2004 | Yang | H04L 47/50 370/235.1 |
| 2004/0165596 A1* | 8/2004 | Garcia | H04L 1/0003 370/395.21 |
| 2005/0168340 A1 | 8/2005 | Mosher, Jr. et al. | |
| 2006/0031182 A1 | 2/2006 | Ryan et al. | |
| 2006/0171523 A1 | 2/2006 | Ryan et al. | |
| 2007/0256082 A1 | 11/2007 | Bhagwan et al. | |
| 2008/0021801 A1 | 1/2008 | Song et al. | |
| 2008/0027980 A1 | 1/2008 | Owens et al. | |
| 2008/0072264 A1* | 3/2008 | Crayford | H04L 29/06027 725/86 |
| 2008/0187898 A1 | 8/2008 | Hattie | |
| 2008/0219557 A1 | 9/2008 | Dawson et al. | |
| 2009/0070780 A1 | 3/2009 | Dinh et al. | |
| 2009/0222930 A1 | 9/2009 | Stasi et al. | |
| 2009/0228531 A1 | 9/2009 | Baumann et al. | |
| 2010/0024042 A1 | 1/2010 | Motahari et al. | |

OTHER PUBLICATIONS

Advisory Action issued in U.S. Appl. No. 13/016,407 dated May 2, 2013.

Non Final Office Action issued in U.S. Appl. No. 13/016,407 dated Oct. 3, 2012.

Final Office Action issued in U.S. Appl. No. 13/016,407 dated Feb. 27, 2013.

Final Office Action issued in U.S. Appl. No. 13/604,157 dated Jul. 3, 2013.

Office Action issued in U.S. Appl. No. 13/604,157 dated Mar. 13, 2013.

\* cited by examiner

DATA INGEST OPTIMIZATION

BACKGROUND

Technical Field

The present invention relates to retrieval of data and, in particular, to data ingest optimization.

Description of the Related Art

Data retrieval and consolidation is an important aspect of many different fields of business, research and services. Oftentimes, analysis of data from many disparate sources is needed to make important decisions and take various actions. However, technical challenges in retrieving and consolidating data for analysis purposes arise due to one or more common features of such data. For example, the data may be fragmented, incomplete or missing in many cases. The data may be replicated and may include errors and redundancies. Further, the data may be distributed across many different data sources and may be mobile between such sources. Addressing these challenges can provide an important asset and an advantage in compiling data to further goals in these fields.

SUMMARY

One embodiment is directed to a method for optimizing the retrieval of data from multiple sources. In accordance with the method, a slot map including slots for the storage of data elements is obtained. The data elements associated with the slots are prioritized by weighting values with costs of retrieving the data elements from respective data sources. Each value is associated with a different data element and indicates a respective degree of importance of the associated data element. The method further includes directing the retrieval of the data elements from the respective data sources in an order in accordance with the priority of die data elements to optimize the quality of data obtainable within a critical time constraint. In addition, the retrieved data elements are stored, in corresponding slots on a storage medium.

Another embodiment is directed to a computer readable storage medium comprising a computer readable program code. The computer readable program code when executed on a computer causes the computer to obtain a slot map including slots for the storage of data elements. The computer readable program code when executed on a computer also causes the computer to prioritize the data elements associated with the slots by weighting values, each of which is associated with a different data element and indicates a respective degree of importance of the associated data element, with costs of retrieving the data elements from respective data sources. The computer readable program code when executed on a computer further causes the computer to direct a retrieval of the data elements from the respective data sources in an order in accordance with the priority of the data elements to optimize the quality of data obtainable for the analysis within a critical time constraint.

An alternative embodiment is directed to a method for prioritizing data from multiple sources for retrieval purposes. The method includes receiving an indication of available data elements, an indication of available data sources capable of providing the respective data elements and quality tags for the data elements indicating a respective degree of importance of the data elements. In accordance with the method, the data elements are prioritized by weighting the quality tags with costs of retrieving the data elements from respective data sources to generate a priority queue. The priority queue is stored on a storage medium. Further, the priority queue, which indicates the prioritized data elements that are retrievable from respective data sources within a critical time constraint, is output.

A different embodiment is directed to a system for optimizing the retrieval of data from multiple sources. The system includes a slot map generator that is configured to generate a slot map including slots for the storage of data elements. The system also includes a priority module that is configured to prioritize data elements associated with the slots by weighting values, each of which is associated with a different data element and indicates a respective degree of importance of the associated data element, with probabilities of retrieving data elements from respective data sources. The system further includes a processor that is configured to direct a retrieval of the data elements from the respective data sources in an order in accordance with the priority of the data elements to optimize the quality of data obtainable within a critical resource constraint.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
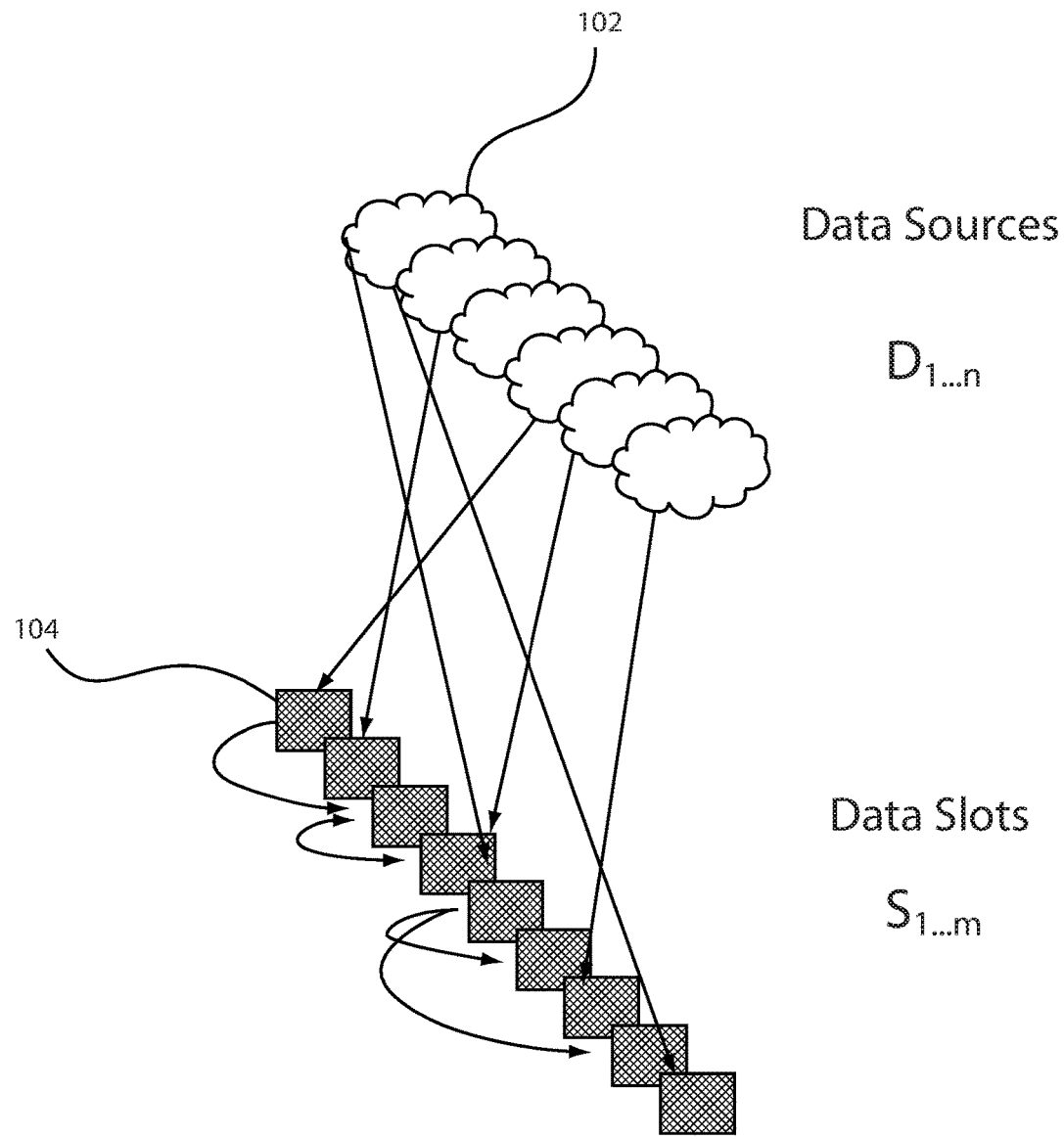
FIG. 1 is a block diagram of a representation of a record of interest.

Aspects of the present principles described herein can be applied in many different fields in which retrieval and consolidation of data from a large number of sources is important. Such fields can include a variety of business, research and service fields. For example, the present principles can be implemented in the fields of finance, trading, the military and health care, and many other fields in which decisions are made based on data from disparate sources. In particular, exemplary embodiments can be implemented to optimize the retrieval of data so that as much of the most important or valuable data as possible can be retrieved within a critical time period. For example, as discussed further herein below, embodiments can be configured to weight a quality or value indication of various segments of data with the probability and cost of retrieving such data that are specific to the different data sources. In this way, embodiments can optimize the retrieval of data such that a relatively complete data set can be provided to a user to enable the user to make informed and prompt decisions, which is especially important in the health care, trading and military fields, where timely decisions are critical.

Although the present principles can be applied in a variety of different fields, aspects of the present principles are described primarily with respect to the health care field for expository purposes. For example, the present principles are especially applicable in the health care field, as the delivery of care depends on the health care practitioner having a relatively complete and up-to-date view of a patient's data at the time of care. For example, the patient data can be based on recent tests, visits, prescriptions, prognoses, etc. Unfortunately, the current healthcare system is faced with many of the challenges described above with respect to retrieval and consolidation of data.

For example, patient data may be fragmented. A typical patient visit may generate five or more lab documents (of the same or differing modalities), each of which is likely to be stored in separate servers and utilizing different representation formats. Further, patient data may be distributed and mobile. For example, patient records may exist at several different providers, payers, etc. As a patient moves, either between providers, locations, etc., several records of care are created at treating or service provision organizations. Patient data is also oftentimes replicated. For example, organizational or legislative policy may dictate that patient information be duplicated for security reasons. Additionally, replicas of institutional data, for example at a health care provider or payer, etc., may be created for stakeholders, such as patients and affiliates, and used as their primary records for service processing and/or delivery. Patient data may also be missing. For example, it is standard practice to have lab results with accompanying interpretative reports. However, in practical scenarios, lab images are stored with no associated reports. Moreover, patient data may include errors and redundancies.

To address these challenges, aspects of the present principles enable a single view of the patient in the environment described above. Furthermore, embodiments enable the retrieval of information on a subject in real-time, where the data includes information that is of multiple modalities and is scattered across (and possibly even replicated across) a large set of potential data sources. For example, such data sources can include a hospital network with a large number of institutions (e.g., more than 50 institutions), each of which may have segments of a patient's docket and may have replicated patient segments for fault tolerance and security or for quick data ingest for triage purposes. In addition, embodiments can produce as comprehensive a collection of information on a patient as possible, given the current state of the input systems. Further, embodiments can enable ingest irrespective of the supported representational format and can enable an automated or semi-automated ingest and consolidation of patient data. The ingest methods can resolve conflicts, reduce redundancies, negotiate fragmentation and distribution, etc. Moreover, aspects can optimize the ingest for the creation of a data warehouse from a potentially large set of disparate sources. In particular, as mentioned above, embodiments can optimize the retrieval of data such that a relatively complete data set can be provided to a user to enable the user to make informed and prompt decisions within a critical time constraint.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection play be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or, other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, combinations of special purpose hardware and computer instructions.

The optimization problems addressed by the present principles can be formulated in a variety of ways. For expository purposes, it can be assumed that there are n data sources $D_1, \ldots, D_n$ from which information is to be gathered. Each data source $d \in [D_1, \ldots, D_n]$ can be viewed as having an associated cost $C_d$ and a probability $P_d$ of returning a valid response. Further, the data sought by a user can be segmented into m data slots. For example, one slot can be allocated to each segment of a patient record that a user is interested in. The optimization problem can be formulated as determining how to maximize the probability of obtaining valid results for as many data slots as possible and, at the same time, minimize the cost of acquiring that data. The problem of maximizing the probability of obtaining valid results for as many data slots as possible is referred to herein as the "completeness constraint." Thus, the optimization problem can be summarized as simply determining how to minimize retrieval costs and maximize the retrieval of important slots. As discussed further herein below, the importance of data in each slot can be indicated by a value v, where $v \in [V_1, \ldots, V_n]$ and $V_i$ is the value of data from source $D_i$ that is used to fill the slot.

Referring in detail to the drawings in which like numerals represent the same or similar elements, a general approach to the optimization problem is illustrated in FIG. 1. The diagram 100 provides a representation of a comprehensive view of a record of interest. As described further herein below, the record of interest can be formulated as a slot map that comprises record slots ($S_{1 \ldots m}$) 104. As indicated in FIG. 1, multiple data sources ($D_{1 \ldots n}$) 107 are accessed to fill record slots ($S_{1 \ldots m}$) 104. Here, the process of data acquisition can involve error handling and redundancy reduction.

Figure 2:
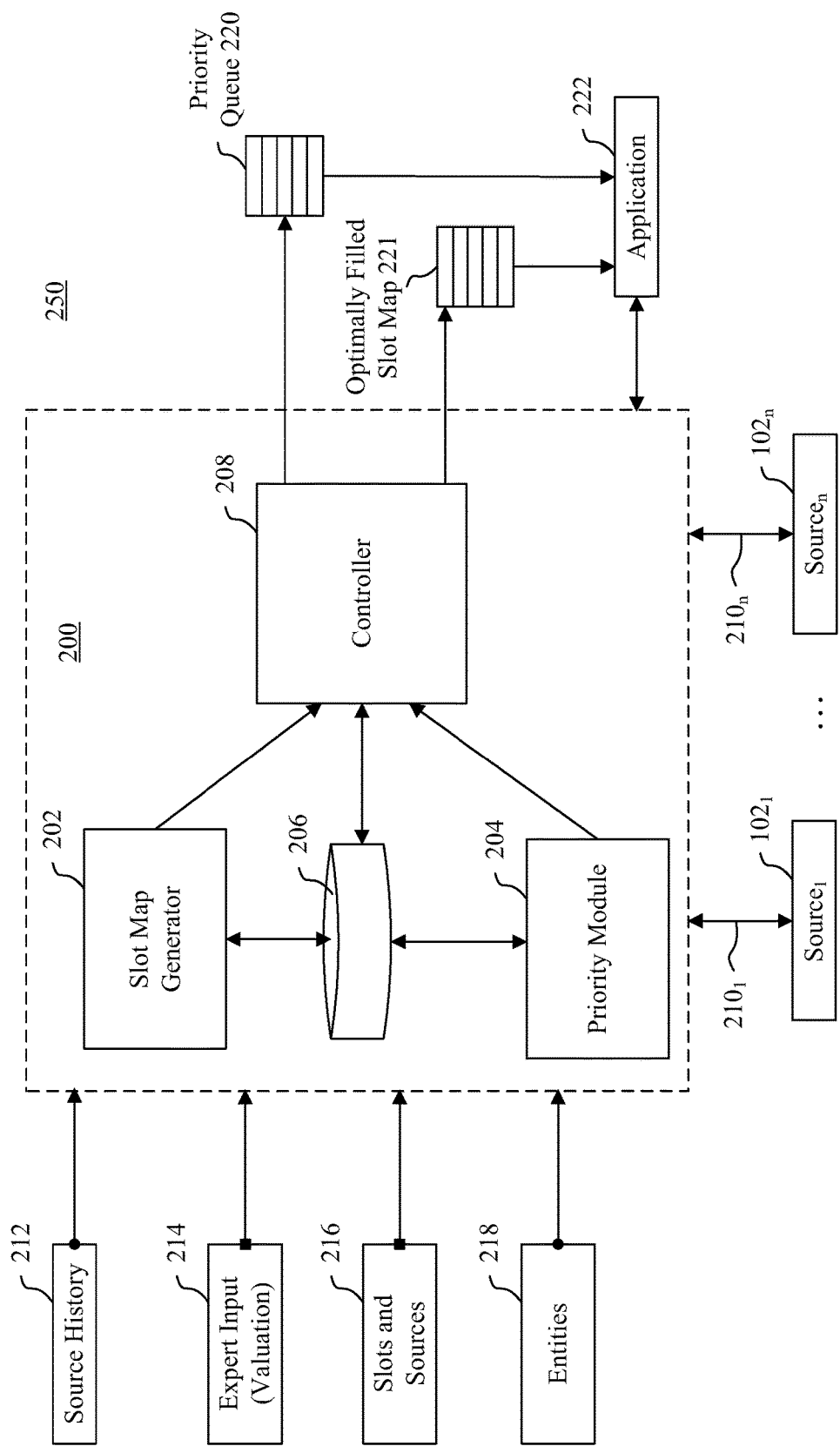
FIG. 2 is a block/flow diagram of an embodiment of a system for optimizing the retrieval of data from multiple sources.

With reference to FIG. 2, an exemplary system embodiment 200 for optimizing the retrieval of data from multiple sources is illustrated. The system 200 may include a slot map generator (SMG) 202, a priority module (PM) 204, a storage medium 206 and a controller 208, each of inch is described in more detail below with respect to exemplary method embodiments. In addition, a wider system embodiment 250 comprises data sources $102_1$-$102_n$. Various information can be input to the system 200 to enable the system to prioritize the retrieval of data elements from data sources $102_1$-$102_n$ to populate the slots 104. Such input can include a data source history 212, expert input 214 regarding the subject for which the slots are generated, information 216 on slots and data sources $102_1$-$102_n$ for data elements that can be retrieved to fill the slots and information 218 associated with entities that control the data sources. The expert input 214 and the slot and source information 216 can be input to the system 200 once, while the source history 212 and the entities 218 can be input and updated repeatedly over time. The data sources $102_1$-$102_n$ can be remote and distributed through a private network, such as a corporate network, a public network, such as the internet, and/or a combination of private and public networks. Furthermore, the links $210_1$-$210_n$ to sources can be part of such networks and can be wired or wireless. In addition, the system 200 can be configured to cooperate with an application 222 so that the application can make calls for an optimally filled slot map 221 and/or a priority queue 220, which are described in more detail herein below.

Figure 3:
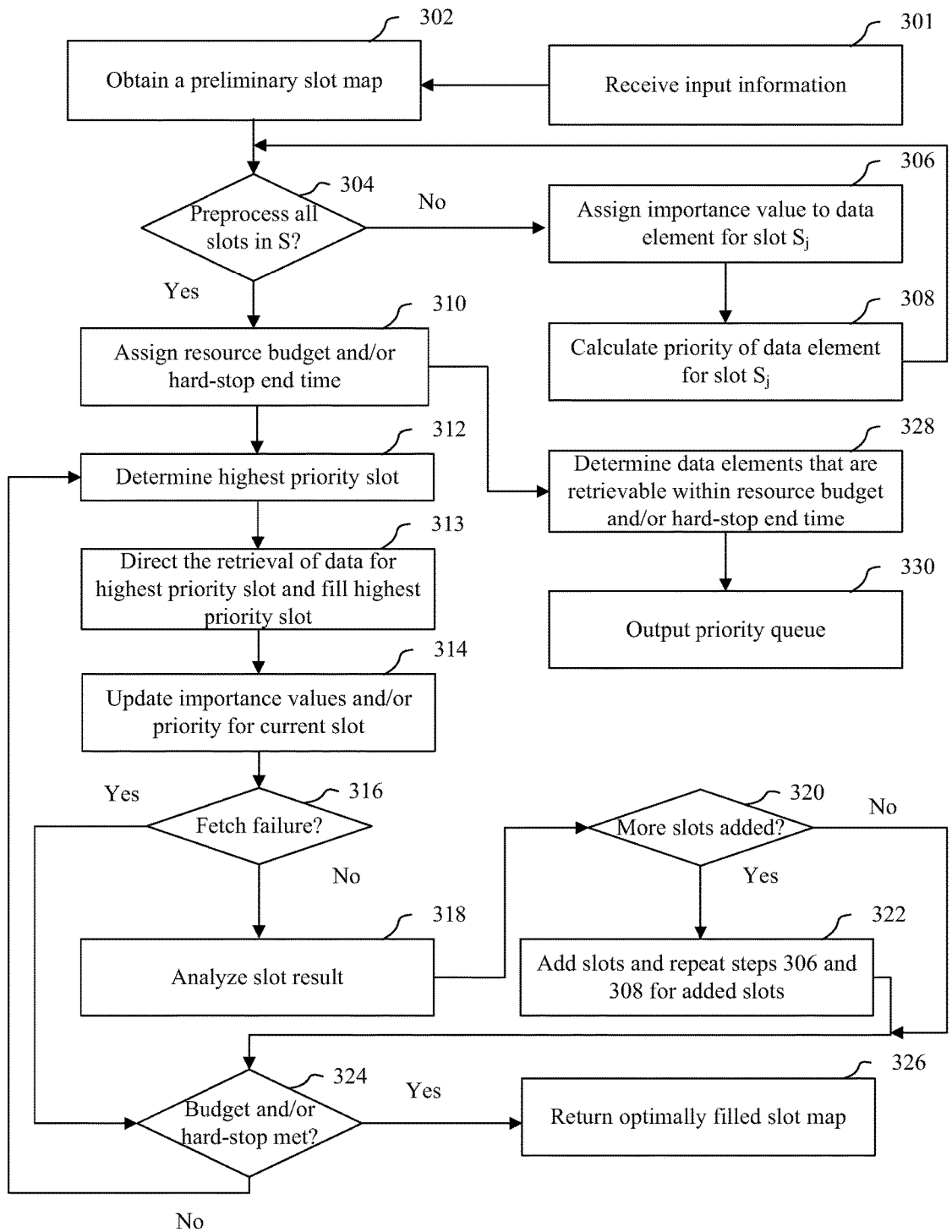
FIG. 3 is a block/flow diagram of an embodiment of a method for optimizing the retrieval of data from multiple sources.

Referring to FIG. 3, with continuing reference to FIGS. 1 and 2, a method 300 for optimizing the retrieval of data from multiple sources is illustrated. The method 300 can begin at step 301 in which the controller 208, which can be implemented as a processor, can receive input information. The controller 208 can receive the input information from a user, from another system element, such as one or more applications 222, or from a remote source, such as one of the data sources $102_1$-$102_n$. Further, the controller 208 can store the information in the storage medium 206 for use by various elements of system 200 to implement the method 300. The information can include any one or more of the following: a data source history 212, expert input 214, information 216 on slots and data sources and data source entity information 218. A data source history 212 can be a record of successes or failures of retrieving data from sources $102_1$-$102_n$ and of resources expended in retrieving the data, such as bandwidth and/or time utilized in fetching the data. The data source history 212 can be employed to statistically determine the probability of successfully retrieving data elements from sources $102_1$-$102_n$ on a future fetch and the costs associated with the retrieval on a future fetch. Moreover, the controller 208 can update the data source history based upon retrieval of data elements in accordance with method 300. As discussed in more detail below, the expert input or valuation 214 can be input by a user to indicate a degree of importance of a data element in an analysis of a subject to which slots 104 are tailored. The information 216 on slots and data sources can detail a collection of slots in which data elements that are relevant to the analysis of the subject can be stored. Further, the information 216 can identify data sources $102_1$-$102_n$ from which the data elements associated with the slots can be retrieved. As described below, the SMG 202 can employ the information 216 to generate a slot map.

Alternatively, the information 216 can be input in the form of a slot map. In addition, the entity information 216 can identify entities 218 that control the data sources, such as a corporation or other entity that owns and controls servers from which data can be retrieved to fill the slots. The entity information can also include security data, such as passwords or security keys to enable the system 200 or the application 222 to access the information from a respective data source $102_1$-$102_n$.

At step 302, the SMG 202 can obtain a preliminary slot map $\{S=S_1, \ldots, S_m\}$ for a subject. For example, the SMG 202 can generate and configure the slot map such that, for each slot $S_j$ the map references data sources $D_i$ from which appropriate data elements can be retrieved to fill the slot $S_j$. The slot map can be stored in the storage medium 206 to permit retrieval of the slot map by the PM 204 and the controller 208. The SMG 202 can construct the slot map based on the slot and source information 216, which can be input to the system 200 by a user or another system element at step 301. Alternatively, the SMG 202 can retrieve the slot map from storage if the slot map was input at step 301. The data elements that can be retrieved to fill the slots can provide material for analysis of a subject. For example, as indicated above, the subject can be an artifact that represents a patient. In addition, the artifact A can be modeled based on core elements of the subject of the artifact and core data expected to be present. For example, artifact slots can be respectively populated with different types of data elements relevant to assessing whether or not a patient has a particular disease. For example, if the disease is tuberculosis, the SMG 202 can allocate a slot for a Chest X-ray, can allocate another slot for laboratory tests of sputum, and can allocate additional slots for other relevant patient data. The slots can also be allocated for information that analyzes these slots. As noted above, the data that is used to fill the slots can be obtained from multiple and different sources and can be in a variety of formats. For example, the data sources $102_1$-$102_n$ can be servers at different hospitals, payers, etc. that are within or associated with a health care network. The subject for which the SMG 202 constructs the slot map can be any record of interest describing a patient, a disease, etc.

In addition, as indicated above, a user or the SMG 202 can construct the slot map for other subjects relevant to other fields. For example, in the field of trading stocks and securities, the slots can be allocated to data elements that can provide material enabling the analysis and estimation of the future value of a stock. For example, the data elements can provide information on the current and historical prices of a stock, the current assets of a company that issued the stock, the prices and assets of stocks in similar businesses, etc. Further, the data sources $102_1$-$102_n$ of the data elements may be various servers across a company network, may be located at servers on a public network, such as the internet, or a combination of a private and public networks.

As another example, in the field of finance, the slots can be allocated to data elements providing material for the determination of an interest rate. For example, such data elements can be directed to a funding cost incurred by a bank to raise funds to lend and operating costs of servicing the loan, which can include application and payment processing costs, salaries of employees and occupancy expense. Data elements can also include information indicating the risk of loan defaults or information indicating an expected profit margin. Further, as described above with regard to the trading example, the data sources $102_1$-$102_n$ of the data elements may be located at various nodes across a private and/or a public network.

Furthermore, the SMG 202 or a user can configure the slot map for military applications. For example, the slots can be allocated to data elements providing information for a battle strategy analysis. For example, the data elements can be information concerning enemy troop and equipment movements. In addition, the data sources $102_1$-$102_n$ from which the data elements can be retrieved to fill the slot map can be satellite sources, storage servers on aircraft, or spotter equipment with forces on the ground. As indicated above, the slot map can be configured for situations in which the retrieval of as much important information as possible within a time constraint is critical.

It should also be noted that although the data elements have been described as being populated with data from different sources, each empty slot can be filled with information from one or more data sources, one or more filled slots or a combination of one or more data sources with one or more filled slots. Furthermore, the SMG 202 can apply quality tags to each slot in die slot map that describe a degree of importance of a data element in an analysis of a subject for which the slot map is generated. The quality tags can be based on the expert valuation 214. For example, the expert providing the valuation can assign a value from a predetermined scale of importance of the data in an evaluation of the slot map.

At steps 304-306, for each slot $S_j$ in S, the PM 204 can assign a priority to the slot $S_j$ in the slot map and can assign a value or importance indication $V_i$ to data at each source $D_i$ that can be used to fill the slot $S_j$. For example, at step 304, the PM 204 can determine whether all slots in S for a particular artifact have been preprocessed. If not all slots in S have been analyzed, then the method can proceed to step 306, in which the PM 204 can assign an importance value $V_i$ to the data at each source $D_i$ from which the data can be retrieved to fill the slot $S_j$. The PM 204 can determine the value $V_i$ in different ways and can base the value $V_i$ on one or more different factors. Such factors can include subject matter expert knowledge (SME), an expectation of success on a fetch, and/or an expected resource expense of performing the fetch. For example, the PM 204 can base the value $V_i$ on expert knowledge of the subject matter of the artifact for which the set of slots is constructed. The PM 204 can receive the expert knowledge or valuation from the expert input 214 provided by one or more users. In particular, the information 214 can be received in the form of quality tags that are associated with data elements in the slot map and with slots that are configured to store the data elements. As noted above, the SMG 202 can apply the quality tags to the slots in the slot map, which can also reference the data sources from which the data elements can be retrieved to fill the corresponding slots. Thus, the quality tags can also be associated with respective data sources that store the data elements. In certain exemplary embodiments, the importance value $V_i$ can itself be a quality tag.

In addition, the PM 204 can base the value $V_i$ on an expectation of success of retrieving the respective data from the source $D_i$. For example, the PM 204 can derive the expectation of success on a fetch from prior fetches of similar datum from the source $D_i$. Further, the PM 204 can also base the value $V_i$ on the cost $C_i$ of performing the retrieval of the data from the source $D_i$. The cost can include the time that would be expended in fetching the data from the source $D_i$, the bandwidth utilized to fetch the data from the source $D_i$, the processing resources used to retrieve the data, etc. The expected resource expense or cost of performing the fetch can also be based on historical data that can be recorded by the PM 204 during previous fetches and stored in the storage medium 206. It should be noted that the PM 204 can determine the value $V_i$ by weighting the quality tags with an expectation of success factor and/or with the cost $C_i$ of performing the retrieval of the data from the source $D_i$. Thus, the value $V_i$ can indicate a degree of importance of the data element hosted as the source $D_i$ by incorporating the quality tag in the determination of $V_i$.

At step 308, the PM 204 can calculate and assign the priority or ROI (return on investment) for the data element(s) of slot $S_j$. For example, the PM 204 can compute the ROI for the data element for the slot $S_j$ by weighting the value $V_i$ as follows: ROI=$(p_{i,t}*V_i)/C_i$, where $p_{i,t}$=prob.$(D_i, s_t)$ is the probability of getting a response from data source when the source is in state $s_t$ at time and $C_i$ is the cost of the data associated with source $D_i$, as noted above. The state $s_t$, and hence, the probability $p_{i,t}$, can be based on the number of requests for data that the data source $D_i$ services at time t, the available bandwidth at the data source $D_i$ for the transmission of data and other information, such as the processing capacity of the data source $D_i$. At least a portion of state information for a source $D_i$, such as the available bandwidth and the requests serviced, can be transmitted to the system 200 periodically and/or can be received by the system 200 from the source $D_i$ upon request by the PM 204. In addition, the controller 208 or a user can pre-store at least a portion of the state in such as the processing capacity of the data source $D_i$, in the storage medium 206 and can periodically update the information. Further, the relationship between each possible state $s_t$ and the probability of retrieving the data from the data source $D_i$ can be predetermined and stored in the storage medium 206 as a lookup table to enable quick processing by the PM 204. Moreover, the probability $p_{i,t}$ can also be based on the expected size of the data to be retrieved from the source $D_i$ to fill the slot $S_j$. After the PM 204 calculates the priority of the slot $S_j$, the method may then proceed to step 304.

It should be noted the system 200, and users thereof, can configure the probability function $p_{i,t}$ in a variety of ways, depending on the specific implementation of the system 200. For example, the controller $102_i$ can be configured to monitor the frequency with which any particular source of data $102_i$ returns valid data over a most recent week. In one simple example, the controller 208 can record the number of requests it had made to the source $102_i$ over the past week and can set the probability $p_{i,t}$ as the ratio of the number of valid requests the source $102_i$ returned in the past week to the number of requests it had made to the source $102_i$ over the past week. The probability function $p_{i,t}$ can vary significantly between sources and can vary between different times of day. For example, if the source $102_i$ is a mainframe, the $p_{i,t}$ can be dependent on the time of day at which a request is made. In this case, the controller 208 can record the number of requests it had made to the source $102_i$ over the past week for several specific time intervals, such as three hour intervals: 9 a.m.-12 p.m., 12 p.m.-3 p.m., 3 p.m.-6 p.m., 6 p.m.-9 p.m., etc. Thus, to determine the probability of retrieving data from a source at a given time interval, the controller 208 can set the probability $p_{i,t}$ as the ratio of the number of valid requests the source $102_i$ returned at that given time interval in the past week to the number of requests it had made to the source $102_i$ at that time interval over the past week.

If at step 304 the PM 204 determines that all slot information in S has been preprocessed, then the method can proceed to step 310, in which the controller 208 can assign a resource budget and/or a hard-stop end time. The resource budget can be or can be based on one or more of a variety of different constraints. One such constraint can be a limit on the amount of data retrieved from data sources $D_i$ or a limit on the amount of data stored in the slots $S_j$. Further, the resource budget can be based on the bandwidth used by the system 200 to retrieve the data elements across a network, can be based on a maximum number of fetches tolerable for populating the slots, can be based on a limit on the number of failed responses from the data sources and/or can be based on processing resources of a computer implementing the system 200. In addition, the resource budget can be based on one or more bandwidth constraints that are source-specific. For example, a source $D_i$ that is at a remote location may have a relatively low available bandwidth. Thus, the resource budget can be dependent on the available bandwidth of the remote data source. Another constraint on which the controller 108 or user can base the resource budget is a threshold limit on the number of requests that the controller 108 or the application 222 simultaneously sends to a data source $D_i$. For example, in the health care application of the present principles, a data source $D_i$ can be a legacy system with a relatively limited capacity for servicing requests. Other constraints on which the controller 108 or user can base the resource budget are constraints imposed by licenses of software or of access to sources $D_i$. For example, the resource budget can restrict access to a source $D_i$ to a number of users specified and limited by a license agreement. Another such constraint can be dependent on the type of data retrieved or on the type of storage medium on which the data is stored at the source $D_i$. For example, echo cardiograms are often stored on magnetic tape at data sources and their retrieval from the tape can take several minutes. Thus, the controller 108 or the user can modify the resource budget to account for long retrieval times associated with particular types of data and storage mediums. Moreover, when determining the resource budget, the controller 108 or the user can prioritize the constraints in accordance with need and objectives of the system.

In turn, the hard-stop end time can be application-specific and can ensure that, the information is received within a critical time period. For example, in the health care scenario, the hard-stop end time can correspond to the time at which the information should be provided to emergency health care personnel to enable them to timely assess the severity of a patient's conditions for triage purposes. The controller 208 can obtain the resource budget and/or the hard-stop end time from a calling application and can assign the budget and/or the hard-stop end time to the slot-map as a whole. Moreover, the resource budget and/or the hard-stop end time can be input at step 301 described above and stored in the storage medium 206 for retrieval by the controller 208 and/or the PM 204. As described herein below, the retrieval of data elements to fill the slot can be constrained by the resource budget and/or a hard-stop end time.

At step 312, the controller 208 can determine which (unprocessed) slot $S_j$ from the set has the highest priority. For example, the controller 208 can scan the slot map for the ROIs or priorities assigned by the PM 204 at step 308 and can select the slot $S_j$ having the highest priority or ROI.

At step 313, the controller 208 can direct an attempt to fetch data for the highest priority slot frown corresponding data sources $D_i$ and can fill the highest priority slot in the slot map with any successfully fetched data.

At step 314, based on the attempt at step 313, the controller 208 or the PM 204 can update the importance value $V_i$ for each data source $D_i$ from which the controller attempted to retrieve data at step 313. Furthermore, the updates can also be performed on other data at source $D_i$ based on the attempt at step 313. Alternatively or additionally, the controller 208 or the PM 204 can update the priority for the slot for which the retrieval was attempted at step 313. For example, the success or failure of the attempt can alter the expectation of success of retrieving the respective data from the source $D_i$ that the PM 204 can use calculate the value $V_i$. In addition, the cost $C_i$ of retrieving the data from the source $D_i$ at step 313 can be updated in accordance with the time expended in retrieving the data from the source $D_i$ at step 313. The controller 208 and/or the PM 204 can also consider the success or, failure of the attempted fetch to update the cost $C_i$. As noted above, the cost $C_i$ can affect one or more of the value $V_i$ and the priority of a slot for which data can be retrieved from a corresponding data source $D_i$. Moreover, the success or failure of a fetch from a data source can be used to determine the probability $p_{i,t}$ of retrieving data from the source $D_i$ at a future time t.

At step 316, the controller 208 can determine whether the fetch was a failure. If the fetch was not a failure, then the method can proceed to step 318, in which the controller 208 can analyze the slot result. For example, the result may trigger the addition of slots to the set S and the slot map. For example, if the slot is a number of line items, then the controller 208 can analyze the slot to determine the number of line items and can add one slot to the slot map for each line item. Thereafter, the method can proceed to step 320, in which the controller 208 can determine whether more slots are to be added. If the controller 208 determines that more slots should be added, then the method can proceed to step 322, at which the PM 204 can add new slots to the slot map and can repeat steps 306 and 308 for the newly added slots. Thereafter, the method can proceed to step 324. If the controller 208 determines that more slots need not be added, then the method can also proceed to step 324, which is described below. It should be noted that the method optionally can proceed to step 324 and can perform subsequent steps simultaneously with the performance of step 322 to save time and thereby increase the amount of data added to the slots within the hard-stop end time, if applied.

Returning to step 316, if the fetch was a failure, then the method can proceed to step 324, in which the controller 208 can determine whether the resource budget and/or the hard-stop time has been expended. If the resource budget and/or the hard-stop time has not been expended, then the method can proceed to step 312, in which the controller 208 can determine the next highest priority slot and one or more of steps 314-324 can be repeated and performed as described above for the next highest priority slot. It should be noted that the controller 208 can evaluate any new slots added at step 322 in a previous iteration to determine the next highest priority slot.

If at step 324, the controller 208 determines that the resource budget and/or the hard-stop time has been expended, then the method can proceed to step 326, at which the controller 208 can return or output the optimally filled slot map 221.

As indicated above, the system 200 can additionally or alternatively provide a priority queue 220. The priority queue 220 can be a queue of work-items, each of which represents an acquisition task to be performed by the application 222. For example, the priority queue 220 can specify a data element, the data source $102_i$, from which the application 222 or the controller 208 can retrieve the data element, and a corresponding slot $S_j$ in which the application 222 or the controller 208 can store the data element after its retrieval.

Returning to step 310, the method may additionally or alternatively proceed to step 328, in which the controller 208 can analyze the costs $C_i$ associated with retrieving data elements from sources $D_i$ 102 and can determine the highest priority data elements, that are retrievable within the resource budget and/or the hard-stop end time. For example, at step 308, the controller 208 can prioritize and order data elements for the slots in a listing in accordance with the calculated priorities. Here, at step 330, the controller 208 can successively examine data elements in the priority order of the listing, beginning with the data element with the highest priority, to determine the costs associated with retrieving each, data element. As the controller 208 peruses the listing, the controller 208 can successively decrement the resource budget and/or the hard-stop end time by the costs associated with the data elements until the resource budget and/or the hard-stop end time is expended. The controller 208 can populate the priority queue with each data element in the priority listing that has been accounted for in the resource budget and/or the hard-stop end time. Further, if the last data element is associated with a retrieval cost that would exceed the resource budget and/or the hard-stop end time, then the controller 208 can scan, the listing in order to find a data element with a cost that would fall within the resource budget and/or the hard-stop end time constraint. The controller 208 can populate the priority queue with that data element, if found. Further, the controller 208 can repeat the scanning process until the resource budget and/or the hard-stop end time is expended or until no data element that can be retrieved within the resource budget and/or the hard-stop end time can be found.

At step 330, the priority queue 220 can be output. For example, the controller 208 can output the priority queue as a complete listing, or the controller 208 can successively output each data element as they are determined at step 328. Here, the priority queue 220 can be stored in a storage medium and can be accessed by the application 222 at any time. As such, the application 222 can begin retrieving the data elements for storage in the slot map as the priority queue is generated.

It should be noted that exemplary embodiments of the method 300 can be implemented through a graphical user-interface (GUI) (not shown). Here, the controller 208 can employ the GUI to display to a user options to indicate available data elements, available data sources capable of providing the respective data element and quality tags for the data elements. For example, as described above, the system can receive this information at step 301. Thereafter, the system 200 can perform the method as described above with respect to steps 302-310 and steps 328-330 to generate and output a priority queue 220 on the GUI in response to receiving the data source and data element information in addition to the quality tag indications from the user.

Embodiments of methods and systems for optimizing the retrieval of data from multiple sources described herein provide significant advantages in scenarios in which information must be received within a critical time period to permit users to make informed decisions. In particular, the method and systems can weight the importance of data with costs and probability of its retrieval from many sources to optimize the retrieval and ensure that as much of the most important data as possible is retrieved within a critical time constraint.

Having described preferred embodiments of systems and methods for data ingest optimization (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A non-transitory computer readable storage medium comprising a computer readable program code, wherein the computer readable program code when executed on a computer causes the computer to:
   obtain a slot map including slots configured for storage of data elements, the slot map including quality tag values associated with each of the data elements applied to each slot in the slot map;
   prioritize the data elements associated with the slots by weighting each of the quality tag values, each of which is associated with a different data element and indicates a respective degree of importance of the associated data element, with costs and probabilities of successfully retrieving valid data elements from each of one or more respective data sources at one or more particular times, and output a priority queue of the valid data elements;
   populate the slot map with one or more retrieved valid data elements, and
   direct a retrieval of the valid data elements from the respective data sources in an order in accordance with a determined priority of the valid data elements to optimize the quality of data obtainable for the analysis within a critical time constraint.

2. The computer readable storage medium of claim 1, wherein the data elements provide material for analysis of a subject and wherein each value indicates a respective degree of importance of a corresponding data element in the analysis.

3. The computer readable storage medium of claim 1, wherein prioritize the data elements further comprises weighting the values with probabilities of retrieving the valid data elements from respective data sources at particular future times.

4. The computer readable storage medium of claim 1, wherein each value is based upon an expectation of success of retrieving the valid data element associated with the value from a corresponding data source.

5. The computer readable storage medium of claim 1, wherein each value is based upon an expected resource expenditure of retrieving the valid data element associated with the value from a corresponding data source.

6. The computer readable storage medium of claim 1, wherein the retrieval is constrained by at least one of a resource budget or a hard-stop end time.

7. The computer readable storage medium of claim 1, wherein the retrieval comprises adding additional slots to the slot map and repeating the prioritize step for the additional slots.

8. The computer readable storage medium of claim 1, further comprising causing the computer to output a priority queue of the data elements.

9. The computer readable storage medium of claim 1, wherein causing the computer to direct further comprises causing the computer to populate the slot map with retrieved valid data elements and to output the slot map.

10. The computer readable storage medium of claim 8, wherein the priority queue includes a queue of work-items, each of which represents an acquisition task to be performed by the application.

11. A system for optimizing the retrieval of data from multiple sources comprising:
    a slot map generator configured to generate a slot map including slots configured for storage of data elements, the slot map including quality tag values associated with each of the data elements applied to each slot in the slot map;
    a priority module configured to prioritize data elements associated with the slots by weighting each of the quality tag values, each of which is associated with a different data element and indicates a respective degree of importance of the associated data element, with costs and probabilities of successfully retrieving valid data elements from each of one or more respective data sources at one or more particular times, and output a priority queue of the valid data elements;
    populate the slot map with one or more retrieved valid data elements; and
    a processor configured to direct a retrieval of the valid data elements from the respective data sources in an order in accordance with a determined priority of the valid data elements to optimize the quality of data obtainable within a critical resource constraint.

12. The system of claim 11, wherein the data elements provide material for analysis of a subject and wherein each value indicates a respective degree of importance of a corresponding data element in the analysis.

13. The system of claim 11, wherein the priority module is further configured to weight the values with costs of retrieving the valid data elements from respective data sources at particular future times.

14. The system of claim 11, wherein the priority module is further configured to base each value upon an expectation of success of retrieving the valid data element associated with the value from a corresponding data source.

15. The system of claim 11, wherein the priority module is further configured to base each value upon an expected resource expenditure of retrieving the valid data element associated with the value from a corresponding data source.

16. The system of claim 11, wherein the critical resource constraint is at least one of a resource budget or a critical time constraint.

17. The system of claim 11, wherein the processor is further configured to add additional slots to the slot map and to repeat the prioritizing for the additional slots.

18. The system of claim 11, wherein the processor is further configured to output a priority queue of the data elements.

19. The system of claim 11, wherein the processor is further configured to populate the slot map with retrieved valid data elements and to output the slot map.

20. The system of claim 18, wherein the priority queue includes a queue of work-items, each of which represents an acquisition task to be performed by the application.

* * * * *